May 23, 1933.  E. G. STAUDE  1,910,413
PAPER BOX MACHINE
Filed Aug. 23, 1930   12 Sheets-Sheet 4
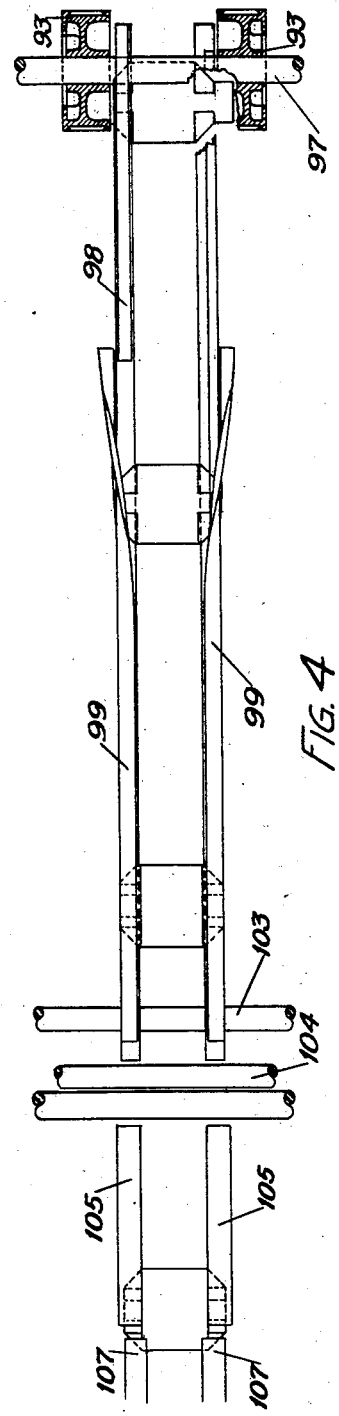
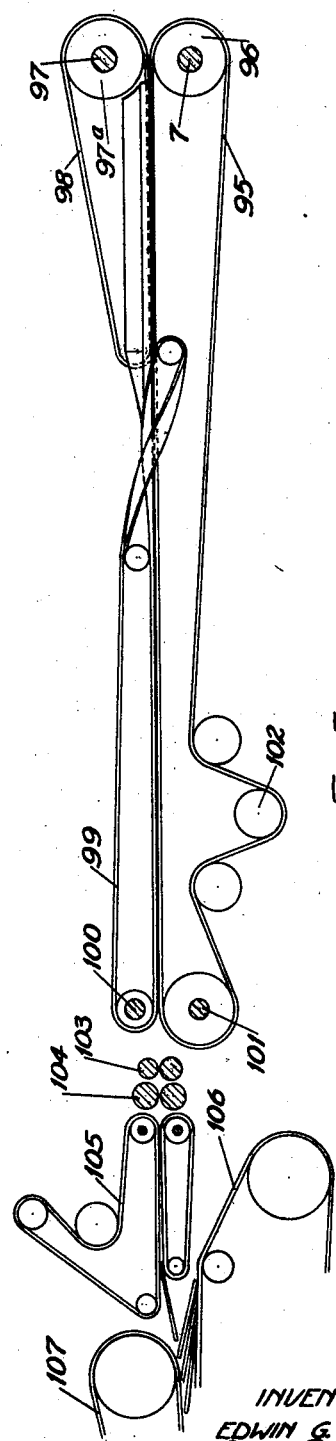
INVENTOR
EDWIN G. STAUDE
BY Paul, Paul Moore
ATTORNEYS May 23, 1933.  E. G. STAUDE  1,910,413
PAPER BOX MACHINE
Filed Aug. 23, 1930   12 Sheets-Sheet 5
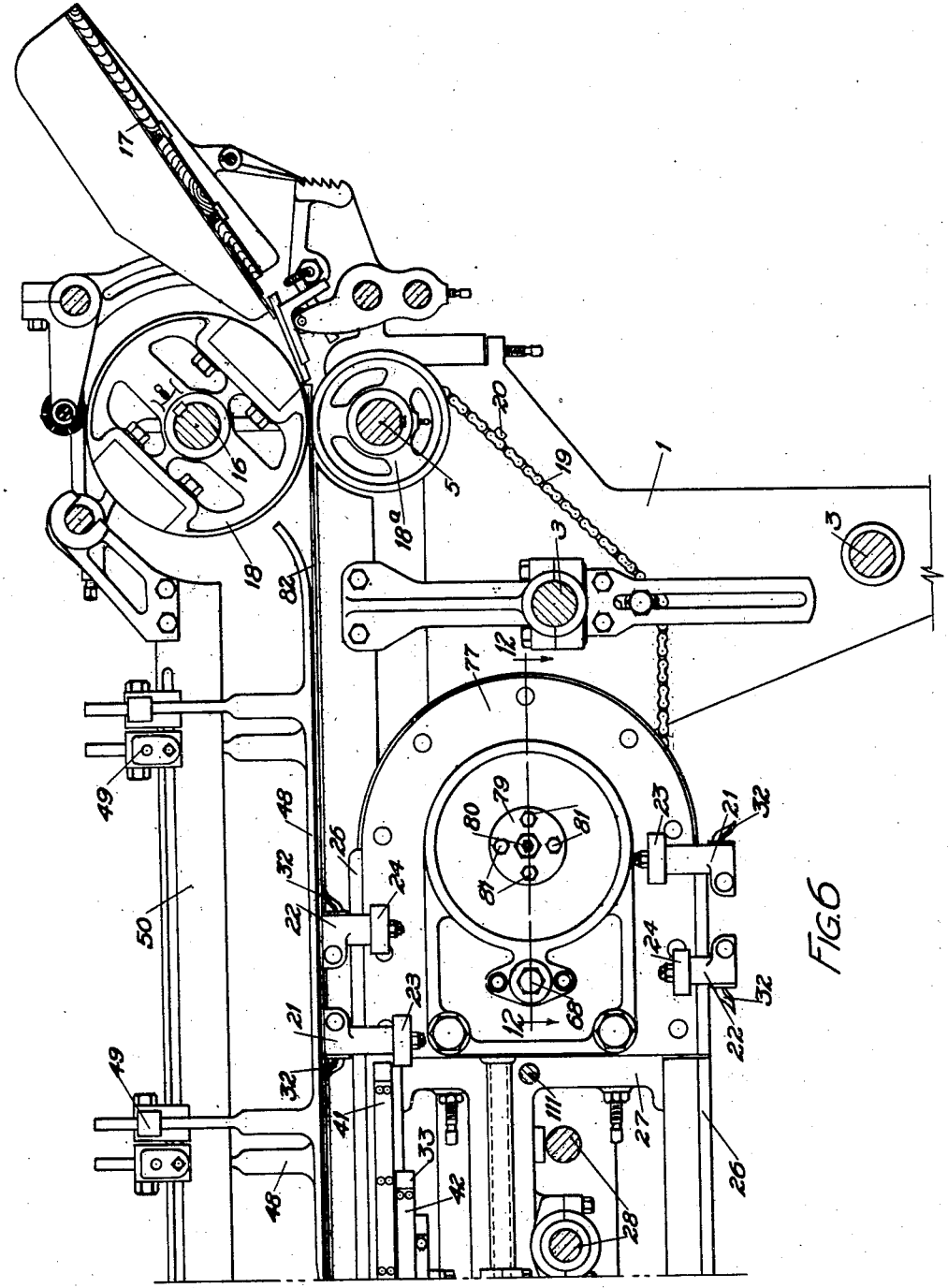

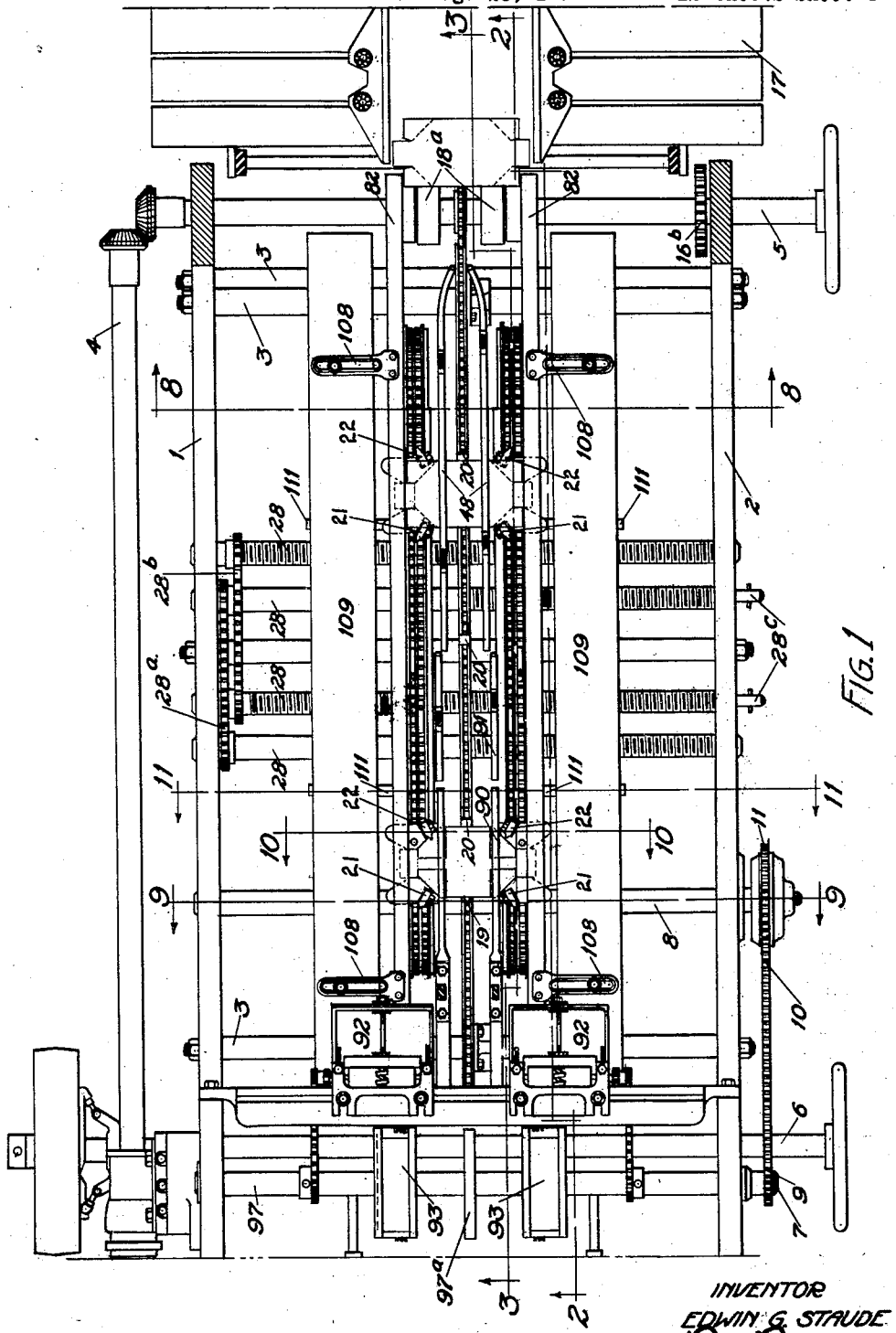

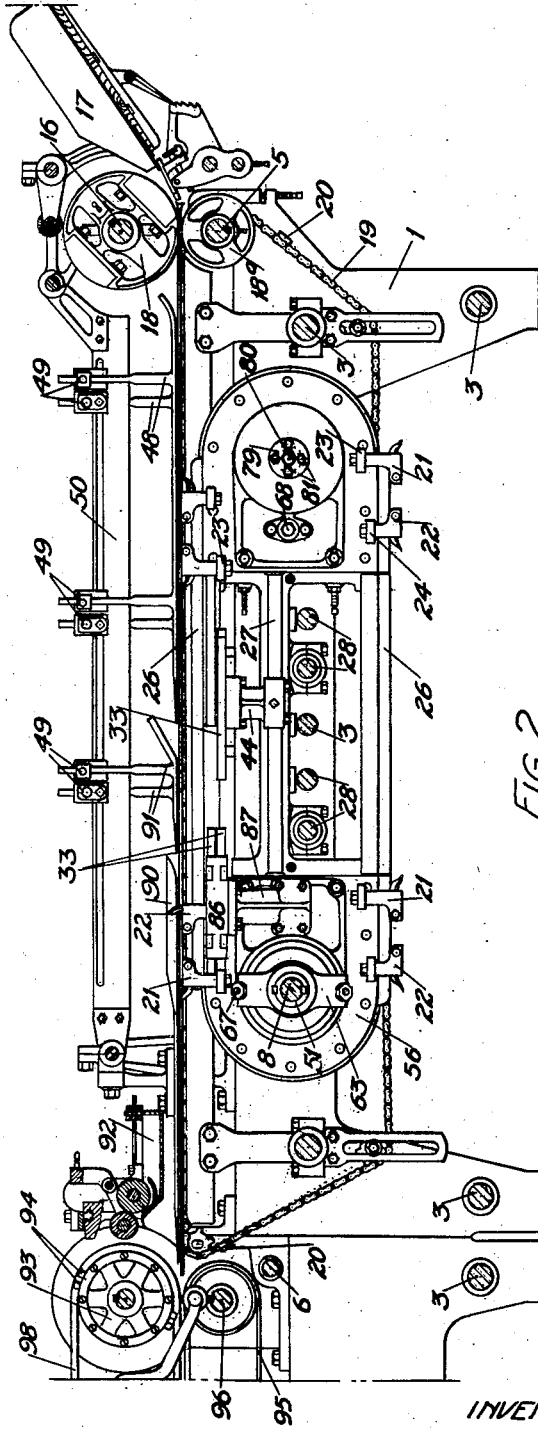

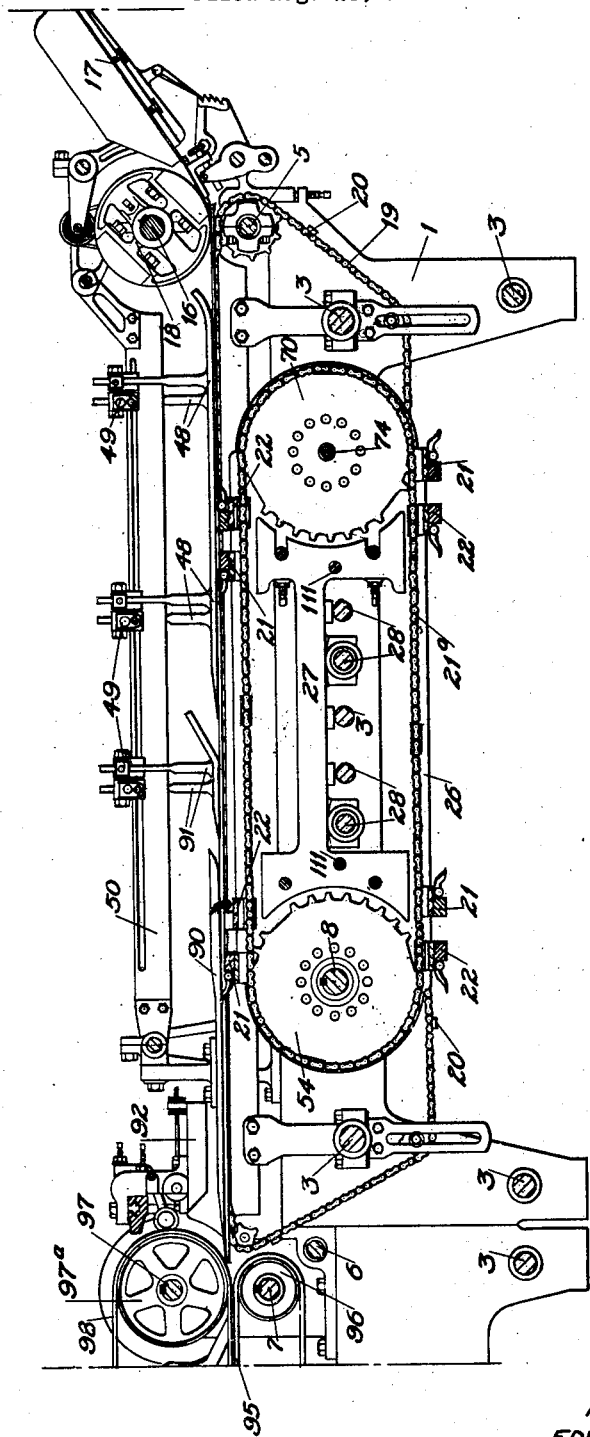

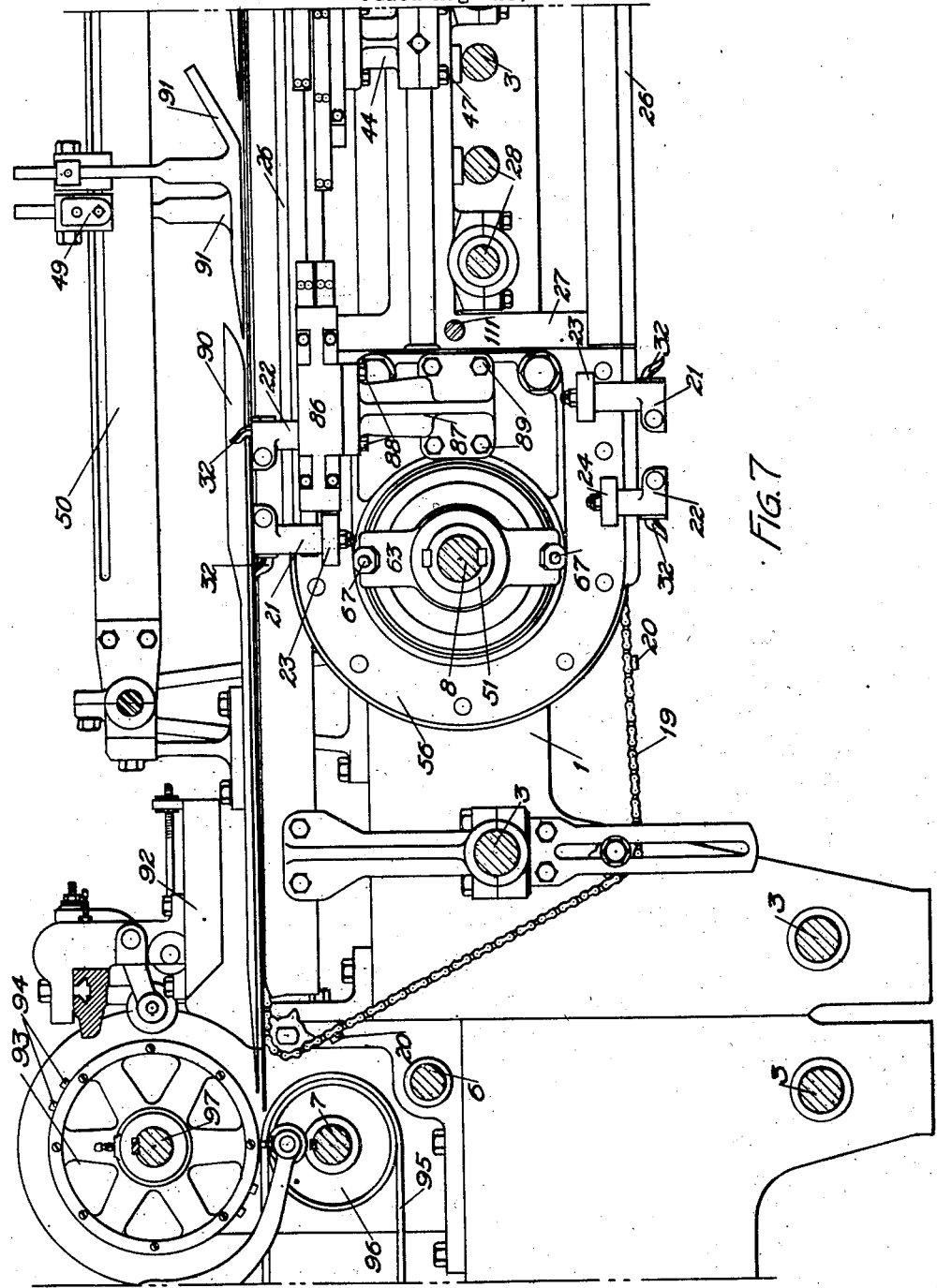

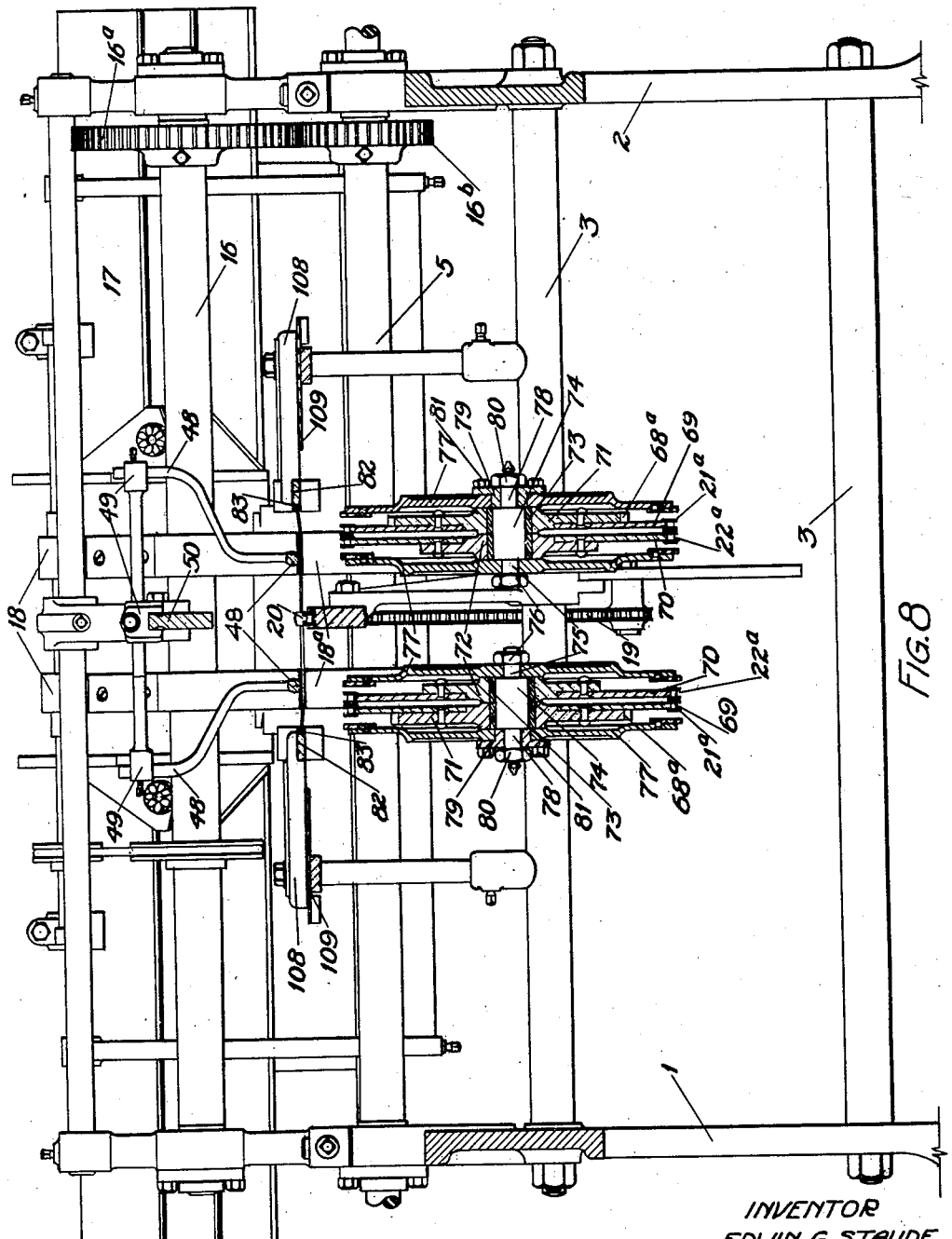

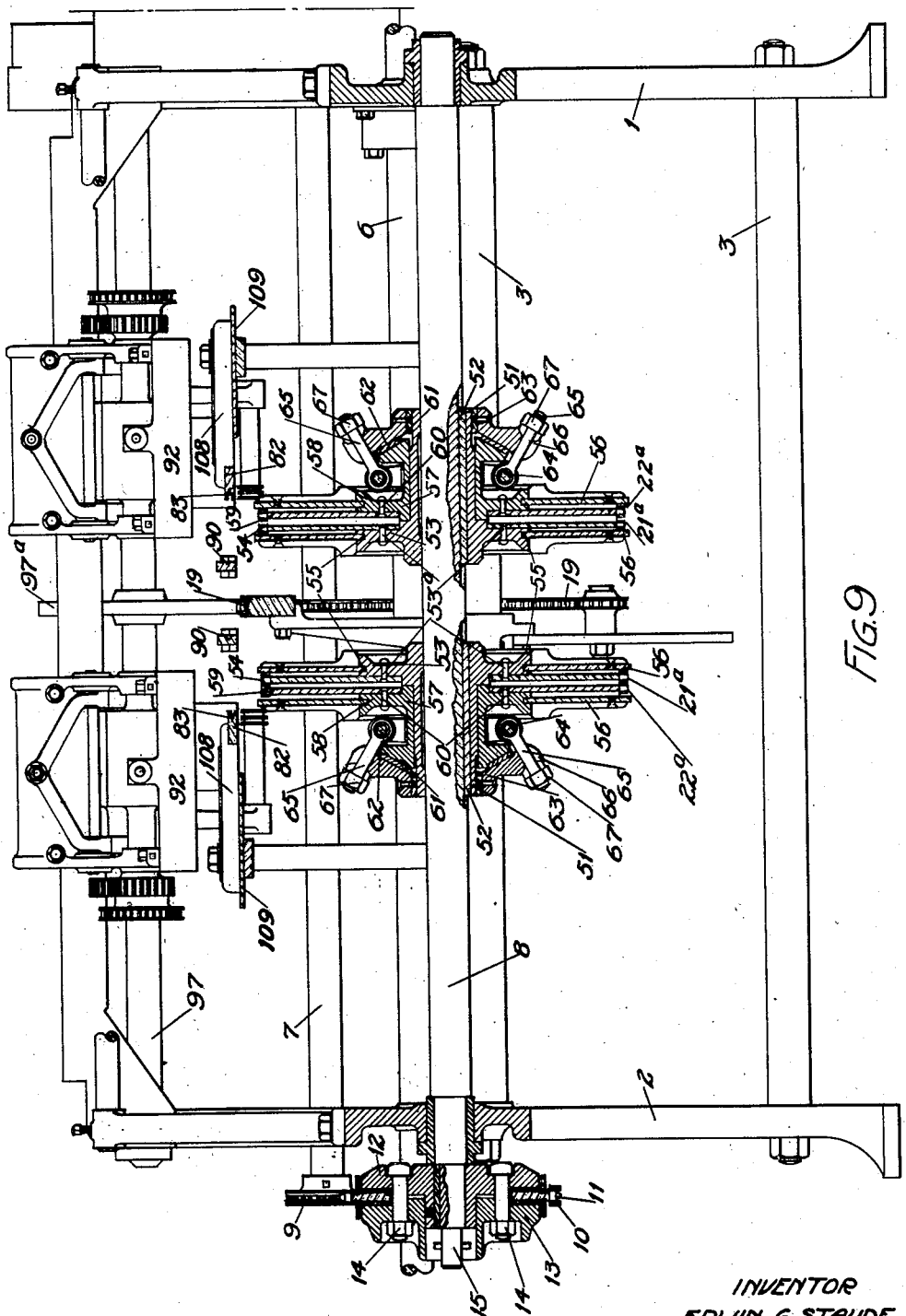

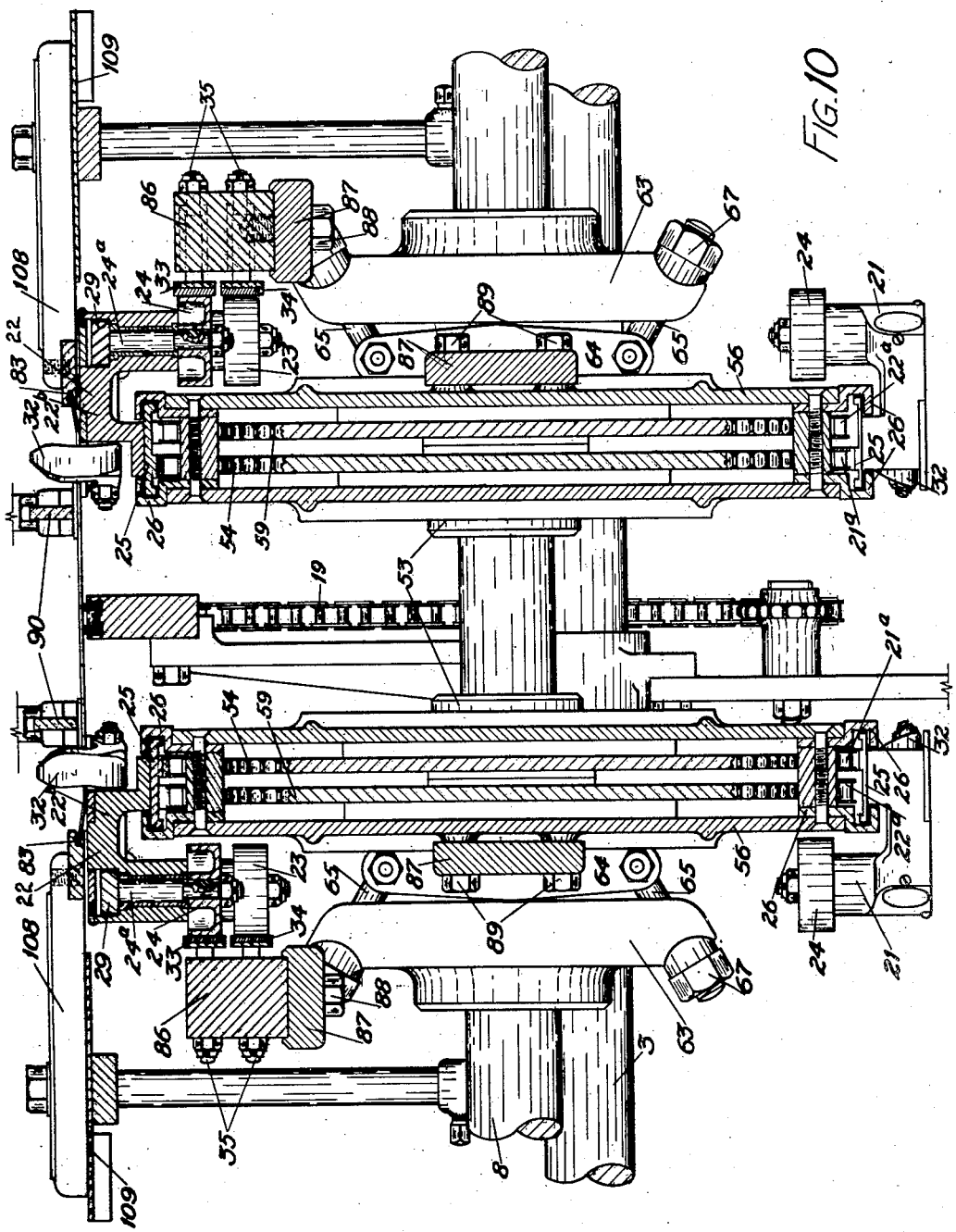

May 23, 1933.　　　E. G. STAUDE　　　1,910,413
PAPER BOX MACHINE
Filed Aug. 23, 1930　　12 Sheets-Sheet 11
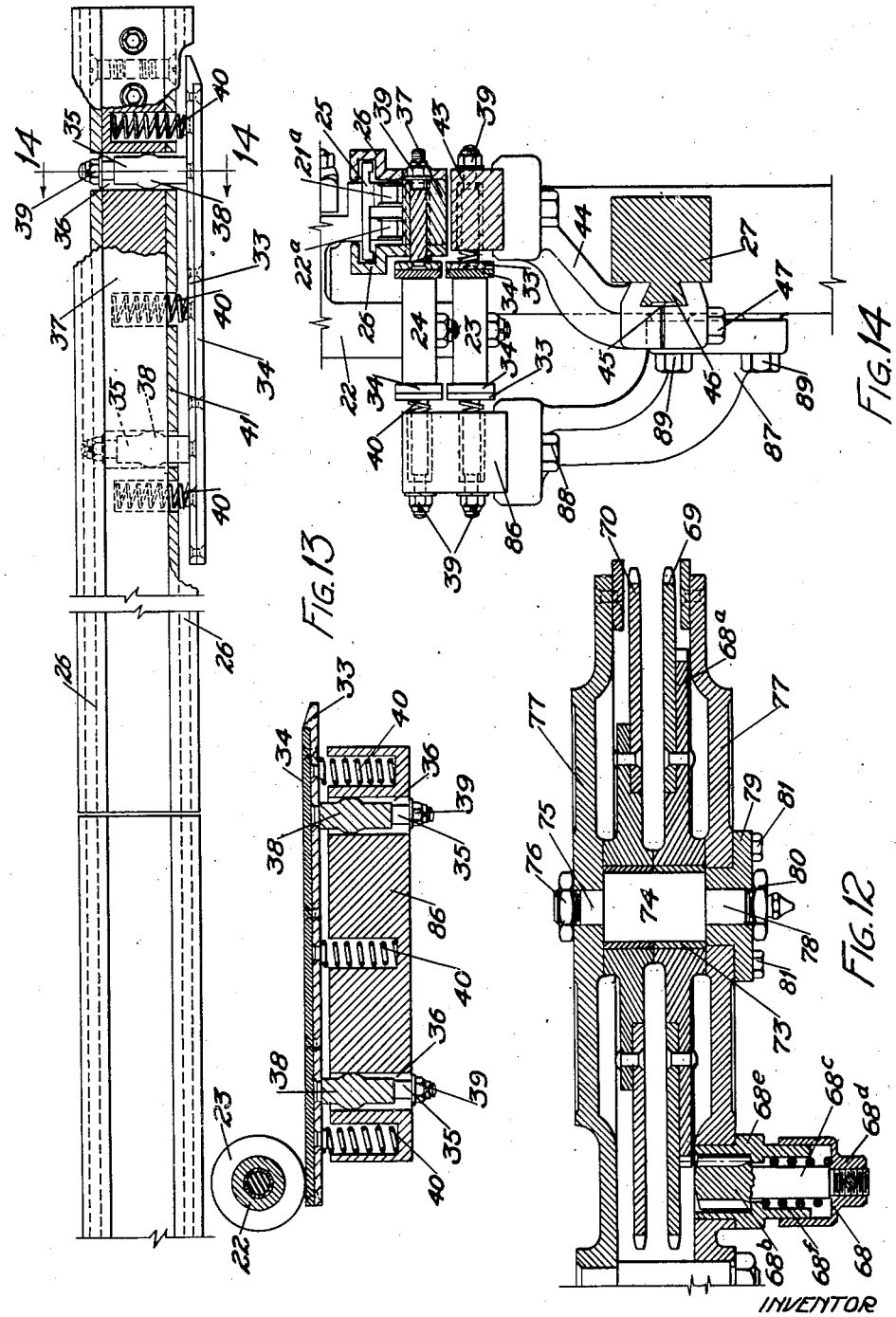
INVENTOR
EDWIN G. STAUDE
BY Paul, Paul Moore
ATTORNEYS May 23, 1933. E. G. STAUDE 1,910,413
PAPER BOX MACHINE
Filed Aug. 23, 1930 12 Sheets-Sheet 12
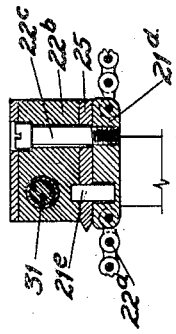
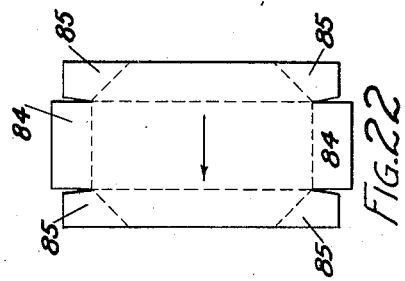
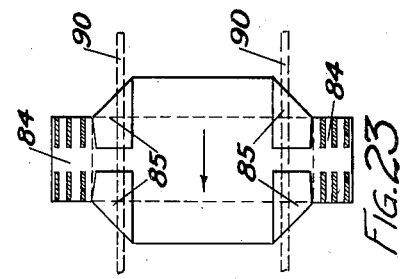
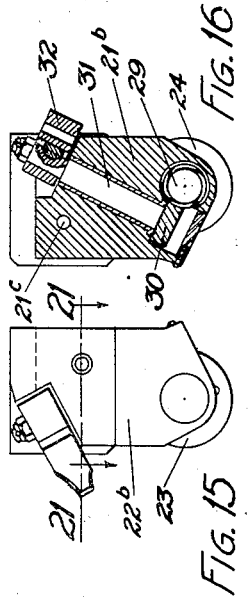
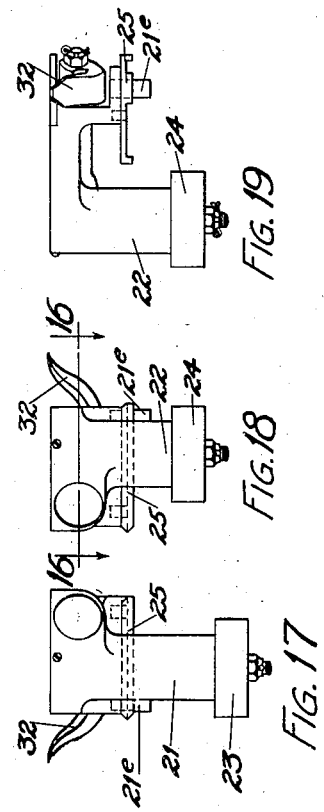
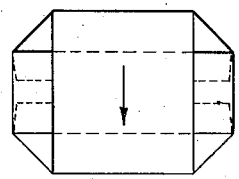
INVENTOR
EDWIN G. STAUDE
BY Paul, Paul & Moore
ATTORNEYS Patented May 23, 1933

1,910,413

UNITED STATES PATENT OFFICE

EDWIN G. STAUDE, OF MINNEAPOLIS, MINNESOTA

PAPER BOX MACHINE

Application filed August 23, 1930. Serial No. 477,322.

This invention relates to improvements in paper box folding and gluing machines capable of making a plurality of folds, applying adhesive at the proper point and delivering the folded blank or tray in a collapsed or flat condition.

The invention also relates to improvements in corner folding mechanism for operating on blanks wherein the end flaps are creased to fold at an angle to the direction of feed, generally at an angle of 45°.

This invention is an improvement over my copending application, Serial Number 346,129, filed March 11th, 1929, for paper box machines.

An important object of this invention is to provide a machine for folding and gluing collapsible or knockdown so-called "diagonal fold" boxes, or containers or blanks, of the general type herein described, at continuous high speed without waste of material.

Other objects are to provide a folding mechanism which shall travel with the blank during folding; to provide a mechanism which will fold all of the four corners of the blank simultaneously; to provide reciprocating folder fingers whose axes shall be substantially parallel with the crease on which the fold is made, thus causing a more accurate fold than would occur where the corners are folded by means that depend on the depth of the crease in the blank to insure alignment of the folded flaps; to provide a folder device which shall engage the underside of the blank and complete the fold through an angle of substantially 180°, and reverse itself to its original or inactive position while traveling with the blank; to provide a mechanism which may be quickly adjusted for different sizes of blanks without the need of "trying out" the proper position of the folders to secure the proper result; to provide simple means quickly adjustable for synchronizing the corner folding units with each other, for various sizes of blanks; to provide a machine which shall have a wide range of adjustment without the need of substituting different parts on the machine; to provide a machine which shall have a maximum capacity for the production of perfectly folded boxes; and to provide a machine which shall be sturdy, and mechanically perfect and therefore require few repairs, and be capable of continuous daily operation.

Features include all details of construction, and combination and sub-combination of the parts, along with the broader ideas of means.

Other objects, features and advantages will appear from the description of the drawings forming a part of this application and in said drawings:

Figure 1 is a plan view (with the feed wheel shaft removed) of that section of the machine which particularly constitutes the mechanism for feeding and folding the four diagonal corner flaps, and also showing the gluing mechanism and the driving connections;

Figure 2 is a section substantially on line 2—2 of Figure 1, looking in the direction of the arrow;

Figure 3 is a section on line 3—3 of Figure 1;

Figure 4 is a diagrammatical plan view, showing the means for folding the center flap and delivering same on to a slow moving conveyor;

Figure 5 is a diagrammatical elevation of Figure 4;

Figure 6 is an enlarged view of the right hand portion of the machine, as shown in Figure 2;

Figure 7 is an enlarged view of the left hand portion of the machine, as shown in Figure 2;

Figure 8 is a cross-section on line 8—8 of Figure 1, looking in the direction of the arrow, or toward the feed end;

Figure 9 is a cross-section on line 9—9 of Figure 1, looking in the direction of the arrow, or toward the delivery end;

Figure 10 is an enlarged cross-section on line 10—10 of Figure 1, looking in direction of the arrow, or toward the delivery end;

Figure 12 is a detail horizontal section on the line 12—12 of Figure 6 of the idler sprockets for supporting the chains which carry the folding units;

Figure 13 is a detail plan-section of the track that supports the folder carriages, and also the closing and opening friction trip mechanism;

Figure 14 is a cross-section substantially on line 14—14 of Figure 13, showing portions of the front and rear folder carriages with the drive wheels in contact with the friction tripping mechanism;

Figure 15 is a top plan view of the folder carriage;

Figure 16 is a plan section on line 16—16 of Figure 18;

Figures 17 and 18 are respectively the front and rear left-hand side folder carriages;

Figure 19 is an end view of Figure 18;

Figure 20 is an end view of Figure 19;

Figure 21 is a vertical section on line 21—21 of Figure 15, showing the manner of securing the folding unit to the carrier chain;

Figure 22 is a plan view of a blank before the folding operation;

Figure 23 shows the four diagonal corners folded in by the traveling folder carriages, and also the location of the adhesive indicated by shaded line on the center flaps; and Figure 24 shows the center panel folded in by the mechanism disclosed in Figures 4 and 5, after the glue has been applied to the center flap.

Figure 11:
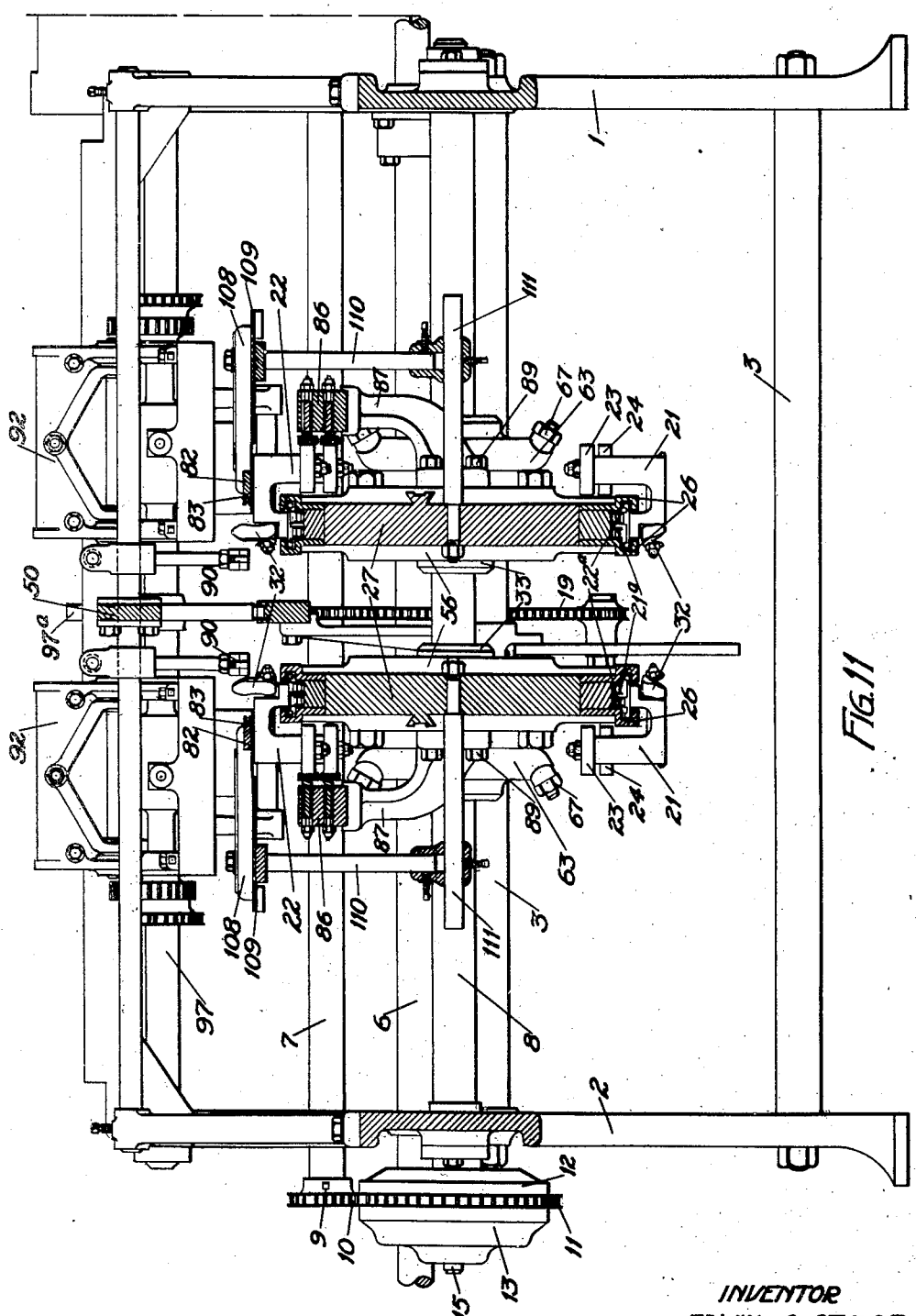
Figure 11 is a cross-section on line 11—11 of Figure 1, looking toward the delivery end, showing the method of supporting the side guides for the blanks.

Numerals 1 and 2 respectively indicate the right and left-hand frame of the machine which is held together by spreader bars 3.

Numeral 4 indicates a suitable side drive shaft which transfers power to the various cross shafts on the machine, including the lower feed wheel shaft 5, lower drive shaft 6 and the lower folding carrier belt shaft 7.

The cross shaft 8 (see Figure 9) is driven by a sprocket 9 on the shaft 7 through a chain 10 around a sprocket 11, held in friction contact by a member 12, which is keyed to the shaft 8 and cooperates with the member 13. This friction clutch facilitates timing of the machine, which is accomplished by simply loosening the nuts 14, placing a crank on the stub 15 of the shaft 8, and revolving shaft 8 into the correct position and then tightening the nuts 14.

Numeral 16, see Figure 2, indicates the upper feed wheel shaft, and 17 is an ordinary feed table or hopper on which a stack of cut and creased blanks is placed.

The feed wheel 18 is driven by the spur gear 16$^a$, see Figure 8, which meshes with the gear 16$^b$ fixed to shaft 5. This feed wheel cooperates with lower feed wheel 18$^a$ by means of suitable blocks of rubber or other suitable material secured to the periphery of the feed wheel 18, and that wheel picks off the top blank and feeds it onto a centrally arranged carrier chain 19. The chain is provided with a series of spaced lugs 20 adapted to engage the rear ends of the blanks (one lug for each blank) to carry them through the first section of the machine, during which period the four corner flaps are folded in a manner later described to the position shown in Figure 23 of the drawing. Additional carrier chains 19 should be used for handling larger size blanks.

As the blank is advanced, it is delivered to and is caused to register with four folder units, the blank and folder units being so timed that proper registration is obtained, see Figure 1. In this case, each group of units is composed of front and rear pairs of folding units, the members of the pairs being spaced transversely of the line of feed, and the pairs being moved by their respective mechanisms, in unison, in longitudinally spaced relation. There are a plurality of groups, and the rear units of each group are generally designated 22, and the front folding units are designated 21, see Figures 1, 3 and 6.

As shown in Figure 6, each front folding unit 21 has a greater vertical height than the rear unit 22, as measured downwardly from the folding level. Each rear folding unit 21 has at its lower end a drive wheel 23, and each rear folding unit 22 has a corresponding drive wheel 24. These wheels are connected to shafts which are operably connected with folding fingers in a manner described below. The shorter shafts 24$^a$ of the wheels 24 are shown in Figure 10. The wheels 23 of the front units 21 are also shown in this figure, as is their relation to their friction drive or trip elements 33. This arrangement permits a placement of the drive elements 33 in direction lengthwise of feed, so that simultaneous operation of the folder fingers can be had, after the blank has been properly registered, as shown in Figure 1, and in a manner explained below. Front units 21 are secured to an endless chain 21$^a$, see Figures 3 and 10, and the rear folding units 22 are secured to an endless chain 22$^a$. The connection is made by means of suitable blocks 21$^b$ and 22$^b$, see Figure 21, and cap screws 21$^c$ and 22$^c$, dowel pins 21$^e$, etc.

It will be noted, in Figure 21, that the cap screw 22$^c$, and the dowel pin 21$^e$ are engaged with a link or block 21$^d$. These blocks are interposed as link-like elements at definite intervals which, in case of the machine as now constructed and operated, is every fifteen inches. With this arrangement, the folding units can be quickly removed for repair or replacement, or other units may be as quickly substituted.

Each folding unit is guided by a cross-head or slide member 25, which moves in a channel element 26. These channel elements are secured to corresponding adjustable cast iron supporting members 27, see Figure 11, which members are mounted on transversely disposed adjusting screws 28, see Figure 1. The supporting members 27, and, therefore, the folding members, can be adjusted laterally relatively to line of feed, or crosswise of the machine, to adapt the machine for folding and gluing any size of blank within the range of the machine.

The pair of adjusting screws for the left frame 27 are connected by a chain 28ª, see Figure 1, running over suitable sprockets secured to the adjusting screws 28, and the pair of adjusting screws for the right frame 27 are connected by a chain 28ᵇ running over suitable sprockets on the screws 28.

By the use of a crank cooperating with stub shafts 28ᶜ of either adjusting screw 28 the corresponding frame member 27, and the mechanism secured thereto can be adjusted laterally to the proper position for running any given size blank.

Referring to Figures 10 and 16: The drive pulley 24 is mounted on vertical shaft 24ª, which shaft has at its opposite or upper end a worm gear 29 meshing with the worm gear 30 carried by shaft 31, at the end of which shaft 31 is keyed a folder finger 32. This arrangement is generally the same for all folder units. It will be noted that the shaft 31 is located at an angle to direction of travel of the blank, and at an angle corresponding to the angle of fold, see Figure 23. Attention is also called to the fact that although the diagonal crease of the blank, see Figure 22, should theoretically be 45° in relation to a line drawn at right angles to the direction of feed, it is in fact only 44° so as to cause the flap to fold down onto the other portion or bottom of the box, better. It is desirable that the angle of the shaft 31 be substantially parallel with the crease angle, and although in the present instance this angle is not 44°, due to lack of clearance necessary when setting the machine for small blanks, the angle is such as to give a very practicable movement of the folder finger which acts upon the flap with a motion which is substantially at right angles to the direction of crease. Therefore, the finger does not drag the flap, out of square, but makes a true fold on the crease line. This is an important feature.

Another important feature is that all four folder fingers operate simultaneously and move with the blank, thus performing the folding operation while carrying the blank, and moving it through the machine in co-operation with the lugs 20 on the chain 19. To explain: If the friction drive elements 34, for operating that pair of folder fingers nearest the feed wheel, were set to function ahead of the friction drive elements 33 which controlled the fingers at the rear side of the blank, then the folder fingers operable by elements 34 would push the stock in a direction away from the lugs 20 of the chain 19, throwing the blank out of register in that direction, and thus making it impossible for the folder fingers to make the proper fold. If the condition were reversed so that the two rear fingers began to fold ahead of the ones nearest the feed wheel, then these folder fingers would forcibly push the blank against the lugs 20 and mutilate the stock and render it unfit for commercial use. Means are, therefore, provided herein to obtain a balanced simultaneous action of the folder fingers so that the folding pressures will be equal, and so that the blank as a whole will not be moved relative to the fingers or to the lugs 20. Thus perfect registration is obtained and maintained, and a perfect folding of each flap results.

In order to give motion to the drive wheels 23 and 24 to operate the folding fingers, friction trips 33, see Figures 13 and 14, are provided and each is faced with leather 34, and is mounted on a pair of studs 35, which operate in slots 36 of a spreader member 37 that separates the two channels or guide-forming elements 26. The studs 35 have an enlarged portion 38, so that they will not bind but act as a sort of ball and socket arrangement. An ordinary castle nut 39 with a cotter pin is provided for limiting the outward position of the member 33, against the action of springs 40. The friction drive elements are thus yieldably held for motion in a horizontal direction.

The construction of all eight of these friction trip mechanisms is exactly alike, the difference being merely in the location, both as respect lateral position and vertical position.

Since the folding units that are nearest to the feed wheel can always fold at the same time, it is evident that the location of the friction trip 33 at the point 41 (see Figure 6) need never be disturbed, since this friction trip acts on the wheel 24. The location of the friction trip 33 for wheel 23, which controls folding of the rear flap, must be changed from the position shown at 42 (see Figures 2 and 6) conformably to blank size, because as the blank varies in size, these folding units must be correspondingly adjusted toward or away from one another. The adjustment of the friction trip shown in position 42, is shown in Figure 14, and consists of a member 43, upon which the friction trip is mounted, which member 43 is secured to a bracket 44. The bracket 44 is provided with a dove-tail slot 45 cooperating with a dove-tail projection 46 on the member 27. A cap screw 47 is provided to secure the bracket 44.

The various steps or operations on the blank during its travel through the machine are as follows: First, the blank is automatically fed from a hopper feed. Second, the blank is engaged at the rear end by lugs 20 on timed carrying chains, which move the blank to the folding mechanism. Third, the four corners are simultaneously diagonally folded. Fourth, the blank is delivered to the gluing mechanism and glue is applied at the proper place on both ends of the center flap. Fifth, the center flap is folded over onto the corner flaps and held under pressure for a short interval. Sixth, the folded blank, which is now a collapsed tray or box, is delivered onto a slow moving conveyor, one blank overlapping the other, where further pressure is applied until the adhesive has "set".

Referring to Figures 6 and 8: As the blank is advanced from the feed wheel 18 and carried along by the lugs 20 on the chain 19, it is held in contact with the chain and also in its proper position with relation to the folding units by a pair of guide rods 48. These guide rods are adapted to be adjusted transversely of line of feed, as well as vertically, by suitable means, generally indicated at 49. This means is adapted to slide on a centrally disposed bar 50, parallel with the direction of travel of the blank. The guide rods 48 are usually adjusted to a point where they are just inside of the low point of the diagonal fold, see Figure 1.

Referring to Figure 9: For the purpose of driving the chains 21ª and 22ª that carry the folding units, hubs 51 are splined to the shaft 8 as at 52, this adapting them to slide laterally with corresponding frames 27, when adjusted. On the inner side of each hub 51, is a flange 53, and secured to this flange by rivets 53ª is a sprocket wheel 54. A groove 55 in the flange 53 is adapted to receive a plate 56 and hold laterally of the member 27, to which the plate 56 is bolted, see Figure 7.

Referring to Figure 9: Mounted on the hub 51 is a second hub 57. This hub is also provided with an extended flange 58 and has a sprocket 59 secured to this flange by rivets 60. The hub 57 is free to rotate on the hub 51. In order to secure it in fixed relation, a beveled surface 61 is provided on the hub 57. This surface 61 is adapted to coact with the surface 62, which is a part of the member 63 secured to the hub 51. The construction just described is a friction clutch arrangement, to permit the adjustment of one sprocket with reference to the other. In order to hold the two members in fixed relation with each other, I provide a ring 64 having eyelet bolts 65 secured to same, and adapted to fit in forks 66 on the member 63, and clamping nut 67 to clamp the two units together. From the construction just described, it is clear that if the machine is to be adjusted for a larger size box, that the folding units must be separated one from the other.

It follows from the description given that the pair of folding units 22 that are nearest to the feeder do not require adjustment so far as adjustment in the direction of travel is concerned. It must then follow that the chain which carries the folding units 21 for folding the flaps that are farther away from the feeder must be advanced independently, and this is accomplished as follows, see Figure 9: The operator loosens the nut 67, which will permit the sprocket wheel 59 and its chain to move independently of the machine. The operator then either pulls on the folding unit or makes use of a mechanism 68, shown in Figure 12, and turns the sprockets into the proper position so that the folding units will have the proper relation one with another. He then tightens the nut 67 after which the sprocket 59 will again revolve as a unit with the sprocket 54.

If a change in relative positions or timing of the sprockets 54 and 59 with reference to the feeder or the chain 19 is required, which chain is rather inaccessible, nuts 14 are loosened, see Figure 9, and by a crank placed on the stub portion 15 of the shaft 8, all of the sprockets 54 and 59 are revolved so that the folding units will assume the required positions, after which nuts 14 are tightened. This operation requires only a moment's time, because of the accessibility of the adjusting mechanisms. The above relates particularly to the driving sprockets for driving the chains that carry the folding units.

At the opposite end, see Figure 8, these chains are carried on idler sprockets 69 and 70 mounted on hubs 71 and 72; the hubs being free to rotate on bushings 73, which bushings are free to rotate on studs 74. Each stud has a counter-turned portion 75 and a nut 76 to secure it in position by clamping on the plate 77, see Figure 6.

On the opposite or outer end is a counter-turned portion 78 adapted to clamp in the member 79 by the nut 80. The member 79 is in turn fastened to the plate 77 by cap screws 81. The diameter of the opening in which member 79 fits is sufficient to permit introduction of stud 74 therethrough to facilitate assembly of sprockets 69 and 70.

Referring to Figure 12, taken on line 12—12 of Figure 6: The mechanism 68 for moving the outside chains 22ª which carry the folding units 22, consists of a gear 68ª formed integral with the hub that carries the sprocket 69. Meshing with this gear is a pinion 68$^b$, which is formed on a stud 68$^c$. At the end of this stud is fixed a sleeve 68$^d$ telescopically fitting sleeve 68$^e$ secured to the plate 77. A spring 68$^f$ normally keeps the pinion out of engagement with the gear 68ª. To adjust the chain 22ª, the nuts 67 (see Figure 9) are first loosened, the operator then pushes in on the member 68$^d$ (Figure 12) against the tension of the spring 68$^f$ and meshes the pinion 68$^b$ with the gear 68ª, and then turns the member 68$^d$ in the desired direction to make the adjustment. By releasing the member 68$^d$, the spring 68$^f$ automatically disengages the pinion 68$^b$ from the gear 68ª, whereupon, by tightening the nuts 67, this adjustment is completed. Suitable chain tighteners, see Figures 6 and 7, are provided to take up the slack and wear of the chains 19.

It will, of course, be understood that the above applies to both folder-unit supporting and operating mechanism, each of which is supported on a guide and supporting member 27. In order to support the blank on its outer edges, particularly the sealed flap, there are provided bars 82 (see Figures 1 and 10) having grooves 83 within which grooves the center flap slides during its movement through the first section of this machine. The bar 82 is secured to the castings 108 (see Figure 11) mounted on plates 109 supported on posts 110, which posts are supported on bars 111 secured to the member 27.

It is apparent, from Figure 22, that the center flap indicated by the reference figure 84 is, in this instance, of greater length than the corner flaps 85. Therefore, the flaps 85 are not long enough to enter the groove 83, but the flaps 84 are guided and the blank is guided laterally through the fact that the flaps 84 travel in the groove 83 parallel to direction of feed and of chain 19. These side guides 82 serve as a gauge, and act to register the blank with reference to lateral position, and to act with the lugs 20 on the chain 19 to square it up, so that it will assume the proper relation to the folding units. The blank is, of course, advanced by lugs 20, through this section of the machine at the same speed as that of the folding units, and the folding is not only accomplished, as the blank advances, but the folding mechanism itself moves with the blank; an imporant feature, making for speed and accuracy.

At the rear end of the first section, the pair of friction tripping mechanisms 33 are shown in Figures 2, 11, 13 and 14, mounted in the members 86. Each member 86 is secured to a bracket 87 by bolts 88 which in turn is bolted to the member 56 by bolts 89. The purpose of these members 33 (located at that side of the rollers 23—24 opposite the previously described corresponding elements) is to reverse the direction of motion of the drive wheels 23 and 24, as the folding units pass this point, so as to open up the folder fingers and get them out of the way of the path of travel of the blank as it advances in delivery direction, and condition them to receive another blank. Since this opening operation follows the completed folding operation, the block 86 is not adapted to be adjusted. Before the folder fingers open, however, the flaps have passed beneath a bar 90 see Figure 2, which holds them down after the folder fingers open and pass out of the path of the moving blank.

During this operation the center flap 84 is still in the groove 83 of the bar 82 (see Figure 10). Other fixtures for holding down the folded flaps are shown at 91 (see Figure 7). These also have a universal adjustment both with reference to in and out position, up and down, as well as forward and back, and are particularly adapted for adjustment at particular points that may be required on boxes having narrow or high walls.

Referring to Figure 7, 92 generally indicates a gluing mechanism similar to that described in my Patent Number 1,193,628, dated August 8th, 1916. Cooperating with this gluing mechanism is a glue wheel 93 having adjustable segments 94 adapted to apply adhesive in the shaded portions of the center flap shown in Figure 23. As the blank passes between the gumming whel 93, mounted on the shaft 97, and the lower belt 95 on the pulley 96, which is keyed to the shaft 7, the adhesive is applied. The blank then passes between the belt 95 and a belt 98 (see Figure 3) driven by the pulley 97ª and is then advanced through the machine. Suitable twisted side folding belts 99, see Figures 4 and 5, fold the center flap 84 over upon the diagonal folded flaps 85 to the position shown in Figure 24. These twisted folding belts 99 pass over driven pulleys 100 and the bottom belt 95 passes over a driven pulley 101. Adjustable tighteners 102 are provided. The blank is then advanced and travels between a pair of rollers 103—104 and further pressure belts 105, and finally deposited on an endless conveyor 106, over which a pressure belt 107 is mounted to bear on the freshly glued seam and keep pressure on this part of the blank until it has had time to securely set.

If the feed wheel 18 is provided with rubber feeding surfaces to deliver one blank per revolution, then the carrying and folding mechanism must be in timed relation therewith to accommodate the blank in its travel through the machine. If, therefore, two feeding surfaces are applied on the feed wheel 18, then double the number of lugs 20 will be required on the chain 19 for feeding the blanks and double the number of folding units. This will mean also that the gumming or gluing elements 94 will have to be doubled likewise. The gumming or gluing cylinders or wheels 93 are, of course, adjustable crosswise of the machine on a shaft 97 to permit them to be quickly located at the proper point in timed relation to the glue flap on the blank.

The invention is not limited to the folding of box-board, but can be used for converting paper into envelopes, bags and many other articles of merchandise that require treatment similar to that rendered by this machine. This part of the machine is only diagrammatically shown, because it is similar to that disclosed in Patent Number 1,104,013, dated July 21st, 1914.

The machine has been shown and described as being adapted to make a plurality of folds on a paper blank during its continuous travel through the machine by endless means traveling with the blank, and as providing means for quickly adjusting the folding mechanism for different sizes and shapes of blanks met with in the paper goods industry, including paper boxes, envelopes, bags, etc. It is perfectly obvious that alterations may be made in the detail structure shown without departing from the spirit of the invention, and therefore there is no intention to limit the invention entirely to the specific structure shown, although some of the details are claimed, along with the broader ideas of means. This invention is not limited to the folding of diagonally creased blanks, because it is readily apparent that the operating angle of the folder operating shaft may be changed so as to readily fold a flap which is creased parallel with the direction of travel or even at right angles to direction of travel, and is therefore adapted to fold any flap on the blank, regardless of position.

The preferred method for attaching the folding units to an endless carrier chain or belt is shown in Figures 1 and 21. The number of groups of folders may be increased, and/or by removing every other co-acting pair, the machine may be adaptable for larger size blanks. In order to make room for the member 21$^d$ (see Figure 21) in the carrier chains, provision must, of course, be made on the sprocket over which the chain operates.

I claim as my invention:

1. In a device of the class described means for feeding a blank, means traveling with the blank for making initial folds thereof, means to receive the blank after initial folding and adapted to apply adhesive thereto, and means adapted to receive the blank after application of adhesive and make final folds therein.

2. In a device of the class described, means for feeding a blank, means for initially folding the blank including endless carriers having folder units, means to receive the blanks after initial folding and adapted to apply adhesive thereto, and means for receiving the blank after application of adhesive, and making final folds therein.

3. In a device of the class described, means for feeding the blank, an endless carrier for advancing the blank, and endless carriers having folding units adapted to make folds in the blank, while both carriers move.

4. A device of the class described having means for feeding a blank, a carrier for advancing the blank, initial folding means comprising endless carriers having folder units having reciprocatory fingers, means for applying adhesive after the initial fold, and means for making a final fold after application of adhesive.

5. In a folding and gluing machine, means for feeding the blank, means for advancing the blank through the machine, multiple folding means comprising endless carriers provided with folding units having reciprocating folder fingers, friction wheels for driving the fingers to make plural folds on the blank, means for applying the adhesive, and means for making the final folds on and delivering the blank in knock-down condition.

6. In a folding and gluing machine, means for feeding the blank, means for advancing the blank, means traveling with the blank for making the initial folds, means for adjusting the folding means laterally across the machine to adapt same for blanks of different sizes, means for applying the adhesive, and means for making the final folds and delivering the blank in knock-down condition.

7. In a paper goods folding and gluing machine, means for feeding the blank, means for advancing the blank, means traveling with the blank for folding the blank, said means including wheels adapted for frictional contact with spring tensioned tracks.

8. A folding mechanism comprising a plurality of endless carriers, means for driving the carriers at equal speed, each carrier having a plurality of folder means adapted to fold a blank, and means for adjusting said carriers independently of one another to vary the space between the folder means of one carrier relative to the folder means of another.

9. A folding mechanism comprising a plurality of endless carriers, means for driving the carriers at equal speed, each carrier having a plurality of folder means adapted to fold a blank placed above them, and means for adjusting said carriers independently of one another to vary the space between the folder means of one carrier relative to the folder means of another.

10. A folding mechanism comprising a plurality of endless carriers, means for driving the carriers at equal speed, each carrier having folder units thereon including reciprocable fingers adapted to fold a blank placed above them, and means for adjusting the carriers relative to one another in direction transversely to direction of feed.

11. A folding mechanism comprising a plurality of endless carriers, means for driving the carriers at equal speed, each carrier having folder units thereon including reciprocable fingers adapted to fold a blank placed above them, and means for adjusting said carriers independently of one another to vary the space between the units of one carrier relative to the units of another, in direction of feed.

12. A folding mechanism comprising a plurality of endless carriers, means for driving the carriers at equal speed, each carrier having folder units thereon including reciprocable fingers adapted to fold a blank placed above them, an endless feed means arranged between the carriers and adapted to move at equal speed therewith to advance the blank while being folded, means for guiding portions of the blank during the folding operation, and means for moving the reciprocable fingers to release the blank after folding.

13. A folding mechanism comprising a plurality of endless carriers, means for driving the carriers at equal speed, each carrier having folder units thereon including fingers reciprocable about axes, which are substantially parallel with the fold line of the article to be folded, and adapted to fold a blank, and plural means adapted to operate the fingers, as result of motion of the carriers to first move them in folding direction and complete the fold, and then move them to release the folded blank and condition them to receive another blank.

14. A device of the class described comprising blank-advancing means, endless chains arranged one at each side of said advancing means, blank-folding means on the chains, and means for controlling the folding means while the chains travel.

15. In a paper goods folding and gluing machine, means for advancing the blank, and endless carriers having folder units adapted to make folds in the blank, the folding units of one carrier adapted to fold one end of the blank and the folding units of the other carrier adapted to fold the opposite end of the blank.

16. A device of the class described comprising blank-advancing means, endless chains, blank-folding means on the chains, said folding means including friction wheels, and stationary shoes with which said friction wheels engage to rotate the wheels.

17. In a folding and gluing machine, means for advancing the blank, endless carriers each provided with folding units having reciprocating folding fingers and friction wheels for driving the fingers.

18. In a folding and gluing machine, means for advancing the blank, endless carriers travelling with the advancing means, each carrier having folding units, means for adjusting the carriers laterally across the machine and means for adjusting the folding units in direction of feed.

19. In a folding and gluing machine, means for advancing the blank, endless carriers travelling with the advancing means, each carrier having folding units, friction wheels for driving the folder units and stationary shoes arranged to rotate the wheels first in one direction and then in an opposite direction.

20. A device for folding blanks having means for feeding, means for advancing the blanks from the feeding means, initial folding means comprising an endless carrier having reciprocable folding units for performing folding operations at the forward end of the blank as it is moved by the advancing means, and an additional endless carrier having reciprocable folding units for performing folding operations at the rear end of the blank, and means for operating the folding units.

21. A device for folding blanks having means for feeding, means for advancing the blanks from the feeding means, initial folding means comprising separate endless carriers having reciprocable folding units for performing folding operations at the forward end of the blank and additional endless carriers having reciprocable folding units for performing folding operations at the rear end of the blank, means for operating the folding units.

22. A device for folding blanks having means for feeding, means for advancing the blanks from the feeding means, initial folding means comprising separate endless carriers having reciprocable folding units for performing folding operations at the forward end of the blank and additional endless carriers having reciprocable folding units for performing folding operations at the rear end of the blank, means for operating the folding units and stationary with reference thereto, means for causing the folding units to travel at the same speed as the blank-advancing means, means for applying adhesive to the flaps of the blanks and means for completing final folds.

23. In a paper goods folding and gluing machine means for advancing the blank, plural endless means traveling with the blank, and respectively having oscillatable members for performing folding operations on the blank during its travel through the machine, and means for operating the folding members for performing folding operations.

24. A device of the class described having endless means for advancing the blanks, a plurality of endless means traveling with the advancing means at least one at each opposite side of said means, each endless means having oscillatable members for performing folding operations on the blank and the folding members of one endless means being adapted to perform folding operations at one side of the blank, and the folding members of the other endless means being adapted to perform folding operations on the opposite side of the blank, and means for operating the folding members for performing folding operations.

25. A device for folding box blanks of the diagonal fold type, comprising blank-advancing means, means movable with the advancing means for diagonally folding portions of the blank at one side, means for diagonally folding portions of the blank at another side, said means comprising folder units having folder members which swing on an axis substantially parallel with the line of the diagonal folds.

26. A device of the class described, comprising blank-advancing means, blank folding means movable with the blank-advancing means and comprising folding units having folder members which swing on an axis substantially parallel with the line of fold, which members start their folding operation from a level beneath the blank.

27. A device for folding blanks of the diagonal fold type comprising a blank-advancing means, means movable with the advancing means for diagonally folding portions of the blank at one side, means for diagonally folding portions of the blank at another side, means for operating the folding means, means adjustable for holding the blank in contact with the advancing means and arranged substantially parallel with the direction of travel and engaging the blank at a point substantially coincident with the intersections of the inner extremities of the diagonal fold lines with the margins of the blank.

28. A device for folding blanks of the diagonal fold type comprising a blank-advancing means, means movable with the advancing means for diagonally folding front portions of the blank, means for diagonally folding rear portions of the blank, means for simultaneously operating all folding means for folding.

29. A device of the class described comprising blank-advancing means, blank folding means movable with the blank-advancing means and comprising folding units having wheel-operated folder members and stationary means cooperable with wheels for successively and reversely rotating the wheels to operate the folder members respectively to advance and perform folding operations, and then move to starting position for release of the blank.

In witness whereof, I have hereunto set my hand this 21st day of August 1930.

EDWIN G. STAUDE.